United States Patent [19]
Endo

[11] 3,857,313
[45] Dec. 31, 1974

[54] APPARATUS FOR SEVERING CONTINUOUS WIRE TO PREDETERMINED LENGTH AND DELIVERING SEVERED WIRE TO CONVEYOR

[75] Inventor: Shigeru Endo, Toda, Japan

[73] Assignee: Pilot Man-Nen-Hitsu Kabushiki Kaisha, a/k/a The Pilot Pen Co., Ltd., Tokyo, Japan

[22] Filed: Oct. 29, 1973

[21] Appl. No.: 410,752

[30] Foreign Application Priority Data
Nov. 1, 1972  Japan.............................. 47-109614

[52] U.S. Cl...................... 83/277, 83/282, 83/294, 83/319, 83/323, 83/151
[51] Int. Cl............................................. B26d 5/22
[58] Field of Search ............ 83/277, 276, 282, 294, 83/319, 323, 325, 151

[56] References Cited
UNITED STATES PATENTS

| | | | |
|---|---|---|---|
| 1,655,471 | 1/1928 | Marcell................................. | 83/277 |
| 1,897,970 | 2/1933 | Hofmann et al....................... | 83/277 |
| 3,369,434 | 2/1968 | Schwalm.............................. | 83/277 |

*Primary Examiner*—Donald R. Schran
*Attorney, Agent, or Firm*—Eliot S. Gerber

[57] ABSTRACT

A pair of blocks each having a conveyor and gripping jaws on the latter are provided such that one of the blocks is movable from the other. A carrier having a cramp is moved between the both blocks and is cooperated with the blocks such that when the carrier acts against the movable block and the immovable block, the cramp is opened and closed, respectively.

8 Claims, 13 Drawing Figures

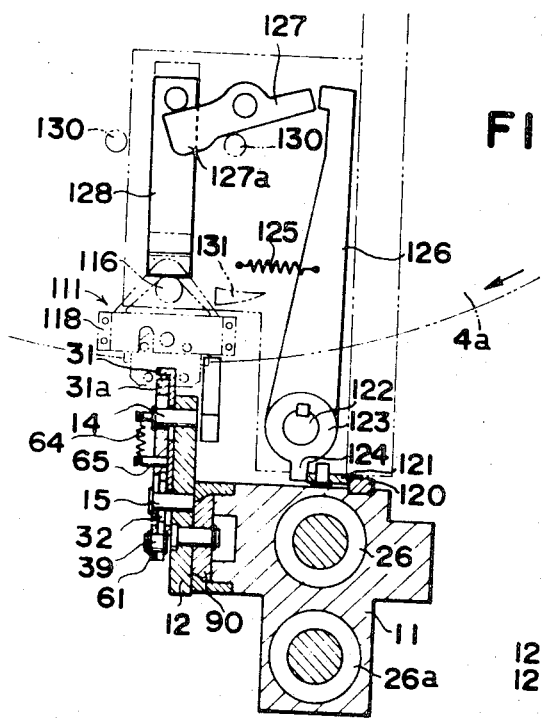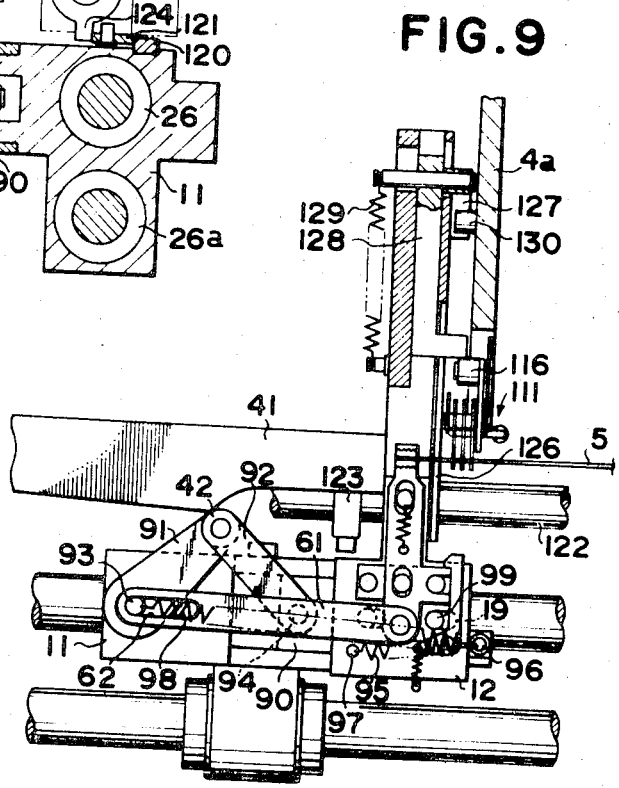

APPARATUS FOR SEVERING CONTINUOUS WIRE TO PREDETERMINED LENGTH AND DELIVERING SEVERED WIRE TO CONVEYOR

This invention relates to an apparatus for severing a wire drawn from continuous wire stock to a predetermined length and delivering the severed wire to a conveyer which grips and transfers the wire to subsequent wire stripping and soldering zones.

Apparatus of this type have ever been proposed and are actually put in practical use. In these apparatus, however, when the length of wire to be severed varies, depending upon the usage of the wire, wire drawing length as well as conveyer width have to be adjusted separately to meet the length of the wire. Accordingly, the apparatus becomes complicated and two separate adjustments have to be made, thus remaining structural disadvantages to be improved.

Accordingly, an object of the present invention is to provide an apparatus of the type defined above wherein wire severing length as well as conveyor width are simultaneously adjusted by a simple operation.

The aforementioned and other objects and features of the invention will be apparent from the following detailed description of specific embodiments thereof, when read in conjunction with the accompanying drawings, in which:

FIGS. 5 to 11 are views showing main portions of an apparatus according to a third embodiment of the present invention, in which FIGS. 6, 7, 9, 10 and 11 show a carrier positioning on lines VI — VI, VII — VII, IX — IX, X — X and XI — XI of FIG. 5, respectively, and FIG. 8 is a sectional view of FIG. 7;

Figure 1:
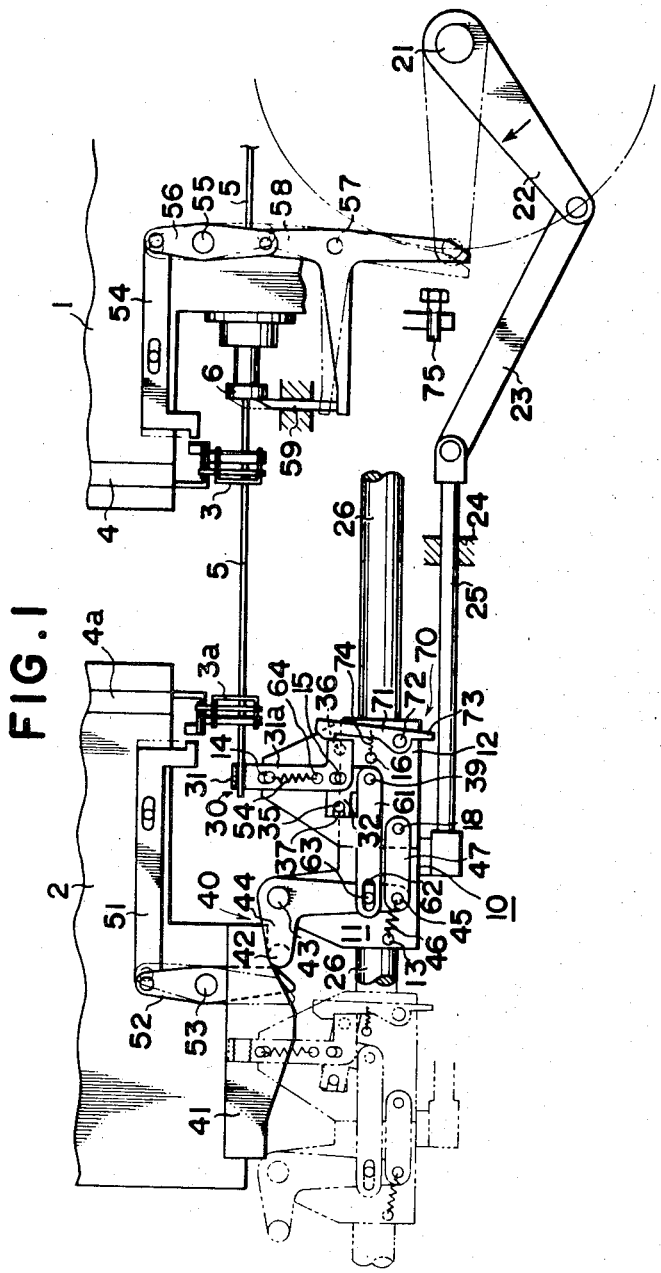
FIG. 1 is a plan view showing main portions of an apparatus according to a first embodiment of the present invention.
Figure 2:
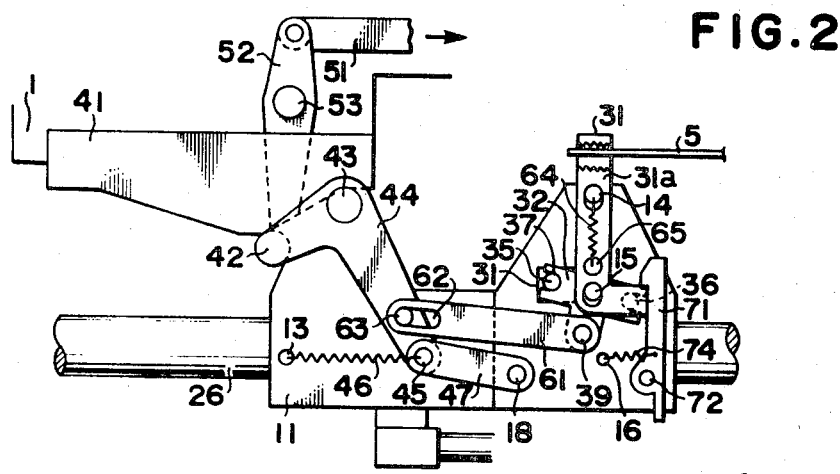
FIG. 2 is a plan veiw partially showing the apparatus of FIG. 1, wherein a wire drawing cramp is open.

Referring to FIGS. 1 and 2 showing a first embodiment of the present invention, an apparatus comprises a pair of movable and immovable opposite blocks 1, 2 each having a periodically and successively rotated conveyer 4, 4a. These conveyers rotate along parallel vertical planes spaced with each other. The conveyers 4, 4a may be endless chain conveyers but, preferably, they are formed of rigid disks so as to transfer the wire in taut condition without vibration of the conveyers. A number of gripping jaws 3, 3a are mounted to the conveyers so that the gripping jawa 3, 3a of a pair on the opposite conveyers 4, 4a may be faced with each other in alignment. A carrier 10 is provided adjacent to the conveyers 4, 4a to move in the direction perpendicular to the conveyer moving direction. The carrier 10 comprises a lower carrier member 11 and an upper carrier member 12, the latter being slidably mounted upon the former.

A wire stock (not shown) is provided at the right side of the immovable block 1 in FIG. 1, from which a continuous wire 5 is fed through a slidable wire guide 6. The space between the opposite gripping jaws 3, 3a is varied in accordance with the length of the wire to be severed by moving the movable block 2 toward or away from the immovable block 1. The severed wire held by the gripping jaws 3, 3a are then subjected to stripping of insulation and soldering while being transferred by conveyer. Since the stripping and soldering do not constitute the present invention, the description relating thereto is omitted here.

The lower carrier member 11 is operatively connected to a reciprocation means 20 such as crank assembly and moved along fixed guide bars 26, in which only one guide bar 26 is appeared in FIG. 1 and the other is disappeared as positioning directly below the former. The crank assembly comprises a crank arm 22 connected to a crank shaft 21, a connecting rod 23 connected to the crank arm 22 at one end thereof, and a rod 25 connected to the other end of the connecting rod 23 and moved through a guide 24. The stroke of the lower carrier member 11 determined by the crank assembly 20 is longer than the length of the wire to be severed and is constant.

Figure 3:
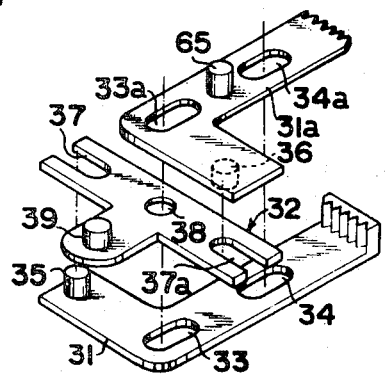
FIG. 3 is a perspective view showing the wire drawing clamp in disassemblage.

The upper careier member 12 is slidable relative to the lower carrier member 11 in the reciprocating directions of the crank assembly 20. The upper carrier member has a clamp 30 which bites an end of the continuous wire to dray out the wire 5 from the wire stock and releases after the wire is held by the gripping jaws 3, 3a. The clamp 30 comprises, as shown in FIG. 3, a J-shaped cramp plate 31, an L-shaped cramp plate 31a, and a T-shaped lever 32. Each of the cramp plates 31, 31a has a lever portion through which two slots 33, 34, 33a, 34a are formed, and a foot portion on which a pin 35, 35a is set up. The L-shaped clamp plate 31a has a pin 65 set up between the two slots 33a, 34a. The T-shaped lever 32 has two slits 37, 37a in its left and right arms, a hole 38 at center portion between the two slits, and a pin 39 set up on its root portion. In assembly, the pins 35, 36 on the J-shaped and the L-shaped clamp plates 31, 31a are engaged to the slits 37, 37a in the T-shaped lever 32, respectively. Then, the slot 33 of the J-shaped clamp plate 31, the hole 38 of the T-shaped lever 32, and the slot 33a of the L-shaped clamp plate 31a are fitted, in that order, to a pin 15 set up on the upper carrier member 12. At this time, the slots 34, 34a of the clamp plates 31, 31a are fitted, in that order, to another pin 14 set up on the upper carrier member 12. Finally, a tension spring 64 is extended between the pin 14 on the upper carrier member 12 and the pin 65 on the L-shaped cramp plate 31. As the cramp 30 is so constructed and assembled, when the arms of the T-shaped lever 32 are in the position shown in FIG. 1, the L-shaped cramp plate 31a is urged upwards by the spring 64 and the clamp 30 is closed. On the other hand, when the T-shaped lever 32 is rotated in the clockwise direction as shown in FIG. 2, the L-shaped cramp plate 31a is pulled against the tension of the spring 64 through the pin 36 fitted in the right slit 37a of the T-shaped lever and the clamp 30 is opened.

In the present apparatus, while the lower carrier member 11 advances, the upper carrier member 12 is temporarily stopped advancing by stopper means with the cramp 30 drawing out the wire from the continuous wire stock. The stopper means 40 comprises, in the embodiment shown in FIGS. 1 and 2, a cam plate 41 attached to the movable block 2, an L-shaped lever 44 having a roller 42 cooperable with the cam plate and swingably pivoted to a pin 43 of the lower carrier member 11, a lever 47 connecting a pin 45 on the free end of the L-shaped lever 44 with a pin 18 on the upper carrier member 12, and a tension spring 46 provided between a pin 13 on the lower carrier member 11 and the pin 45 on the L-shaped lever 45. In the advancing movement of the lower carrier member 11, the roller 42 comes to contact with the cam surface of the cam plate 41. Thereafter, when the lower carrier member 11 further advances, the L-shaped lever 44 rotates about the pivot pin 43 in the counterclockwise direction against the tension of the spring 46, thereby stopping the advancement of the upper carrier member 12 through the lever 47.

By moving the block 2 to adjust the distance of the cam plate 41 from the immovable block 1, the stopping position of the upper carrier member 12 and the cramp 30 mounted thereon can be adjusted, so that the length of the wire 5 to be drawn from the continuous wire stock is also adjusted. This means that by adjusting the length of the wire 5 to be drawn, the interval between the opposite gripping jaws 3, 3a mounted to the conveyers 4, 4a on the blocks 1, 2 is also adjusted.

The lower carrier member 11 further advances in the left hand direction in Figures after the upper carrier member 12 has been temporarily stopped. While the lower carrier member 11 advances to the position shown by chain lines in FIG. 1, the closing of the gripping jaw 3a and opening of the clamp 30 are effected in turn, which shall be referred hereinafter. When the lower carrier member 11 advances to the extent where the cam roller 42 passes beyond the protuberance of the cam plate 41, the upper carrier member 12 is pulled forwardly by the spring 46 and, thereafter, the both carrier members 11, 12 are moved together.

Figure 4:
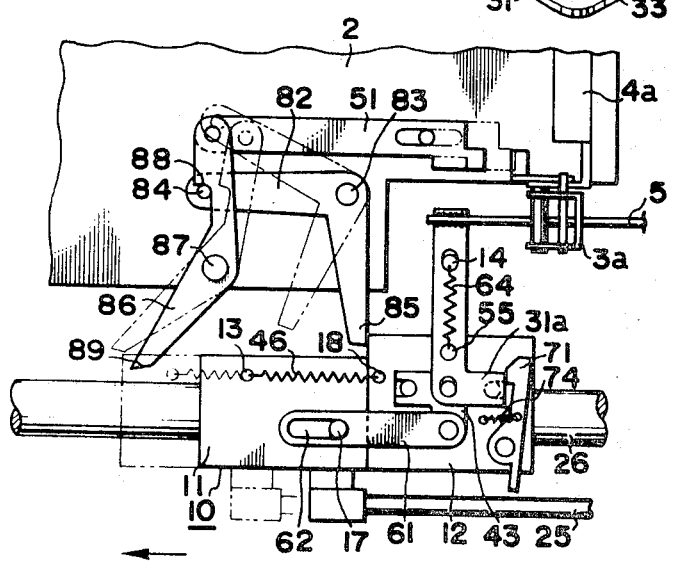
FIG. 4 is a plan view partially showing an apparatus according to a second embodiment of the present invention.

Shown in FIG. 4 is another structure for temporarily stopping the upper carrier member 12. In this structure, in place of the cam plate 41, an L-shaped lever 82 having a pin 84 at its free end and another lever 86 having a hook portion 88 engagable with the pin 84 on the L-shaped lever are pivoted to the movable block 1 by pins 83 and 87, respectively. In case the hook portion 88 of the lever 86 engages with the pin 84 of the L-shaped lever 82 shown by solid lines in FIG. 4, the advancing upper carrier member 12 collides by its front end with the free end 85 of the L-shaped lever 82, whereby the upper carrier member 12 is prevented to advance and only the lower carrier member 11 is further advanced. The stoppage of the upper carrier member 12 is maintained until the advancing lower carrier member 11 collides by its front end with the free end 89 of the lever 86 to rotate the lever 86 in the clockwise direction shown by chain lines in FIG. 4 and thereby, to release the engagement between the pin 84 and the hook 88. After the engagement of the pin 84 with the hook 88 has been released, the upper carrier member 12 is pulled toward the lower carrier member 11 by the spring 46 and, thereafter, both of the carrier members are moved together.

In another modification shown in FIG. 5 to FIG. 11, a roller 42, which is also cooperable with the cam plate 41 secured to the movable block 2, is provided at a junction of links 91 and 92, in which the remaining ends of both of the links 91, 92 are pivoted to the lower carrier member 11 by a pin 93 and to an intermediate carrier member 90 between the upper and lower carrier members by a pin 94, respecitvely. A tension spring 95 is extended between a pin 96 on the end of the intermediate carrier member 90 and a pin 97 on the upper carrier member 12. Another tension spring 98 is extended between the pin 93 on the lower carrier member 11 and the pin 96 on the intermediate carrier member 90. The tension of the latter spring 98 is slightly weaker than that of the former spring 95, but strong enough to overcome the frictional resistance generated at the time when the wire is drawn through the guide 6.

Figure 5:
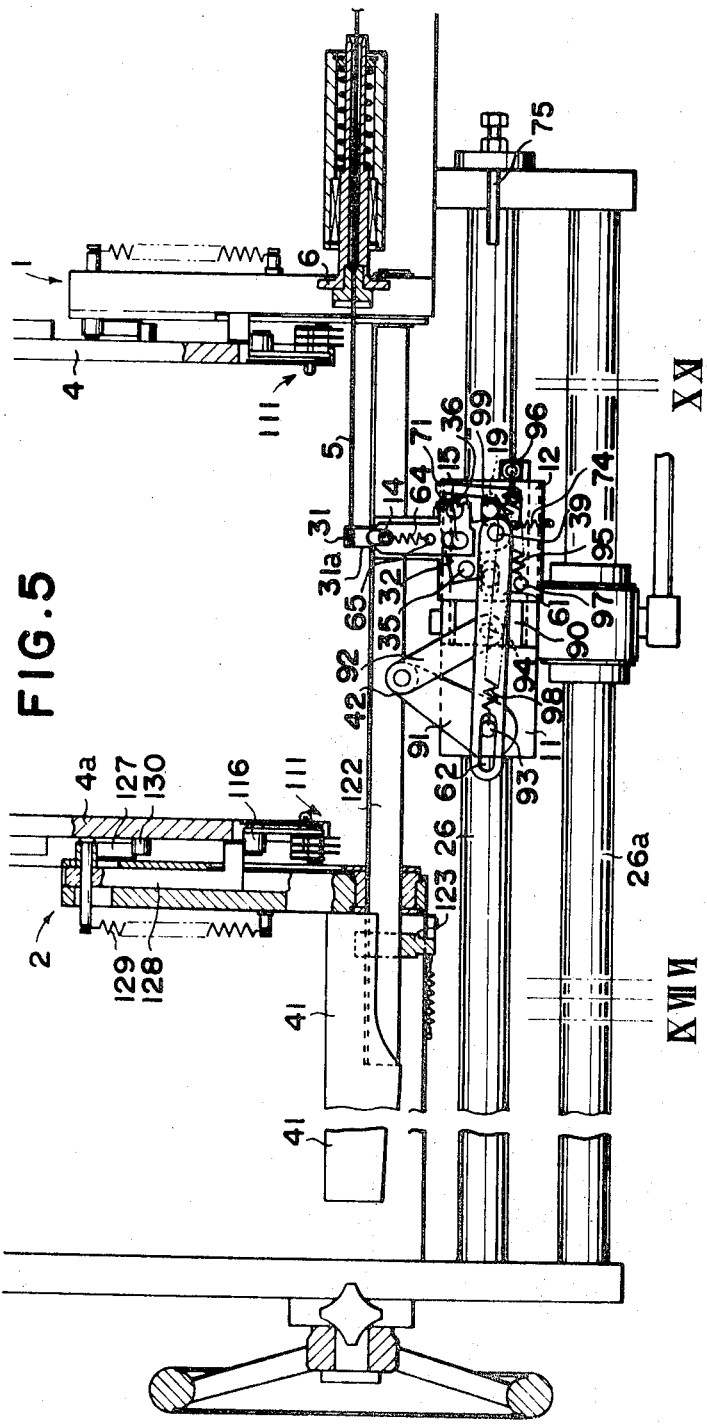
Figure 6:
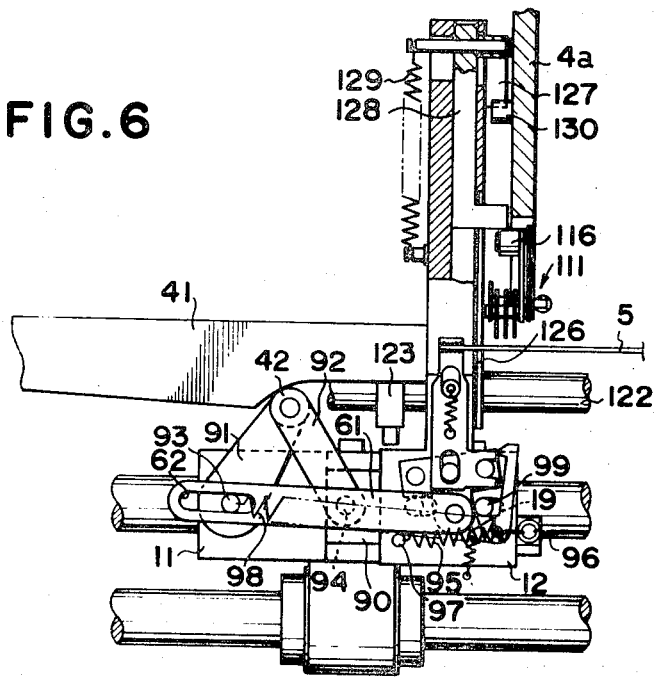
Figure 7:
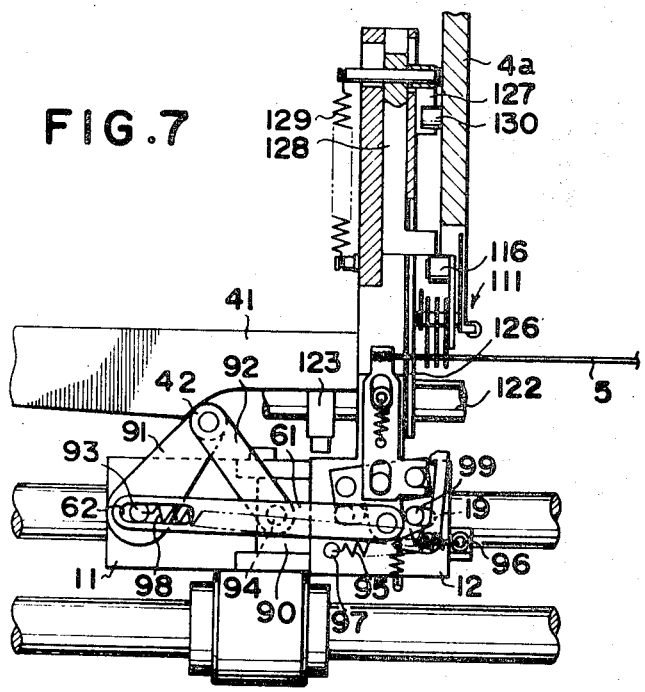
Figure 10:
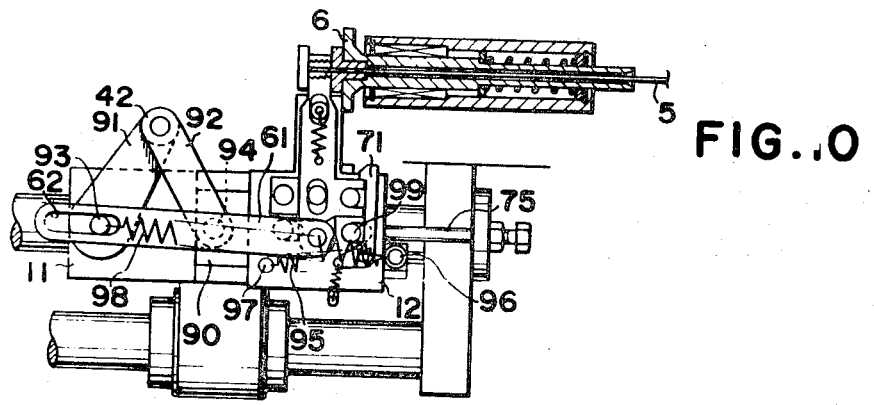
Figure 11:
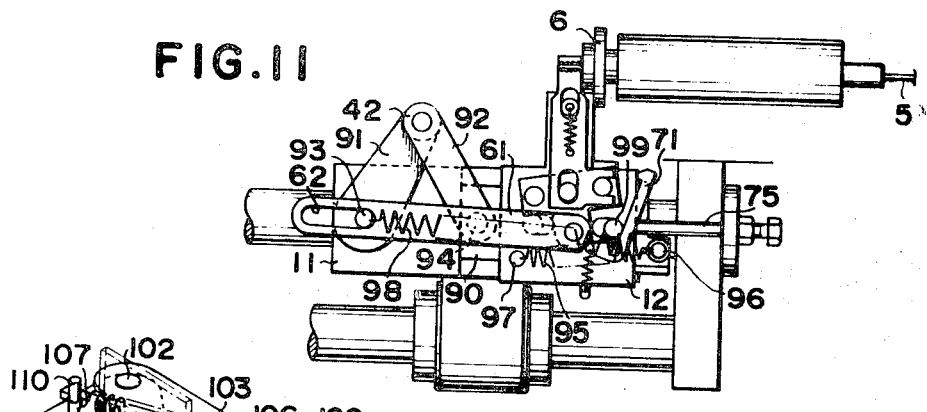

When the lower carrier member 11 advances in the left hand direction from the position shown in FIG. 5, the roller 42 comes to contact with the cam plate 41 as shown in FIG. 6. By further advancement of the lower carrier member 11, the link 92 pivoted to the intermediate carrier member 90 rotates in the counterclockwise direction as shown in FIG. 7 and stops the advancement of intermediate carrier member 90 in spite of the advancement of the lower carrier member 11. At this time, the upper carrier member 12 tends to move to the advancing direction of the lower carrier member by inertia thereof. However, due to the action of the tension spring 95, the upper carrier member 12 is stopped advancing substantially at the same time as the intermediate carrier member 90 stops. After the lower carrier member 11 has advanced beyond the protrusion of the cam plate by further advancement from the position in FIG. 7, the intermediate carrier member 90 as well as the upper carrier member 12 are pulled toward the lower carrier member 11 and, thereafter, move together with the lower carrier member 11.

Figure 12:
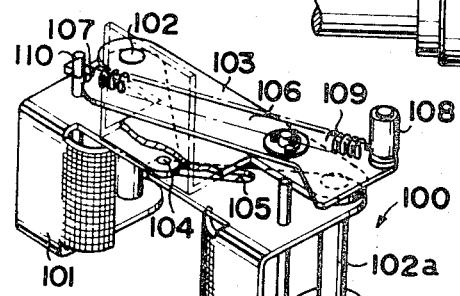
FIG. 12 and FIG. 13 are perspective views each showing a different embodiment of a gripping jaw.
Figure 13:
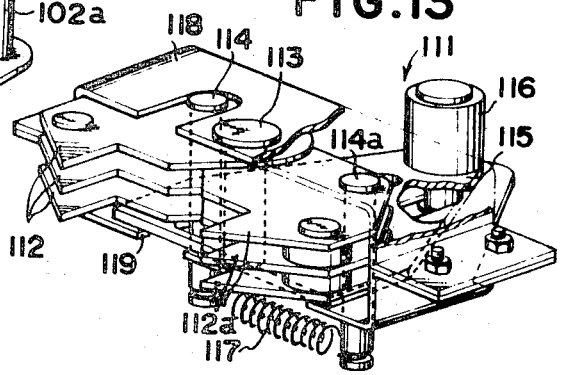

In order that the wire 5 drawn from the continuous wire stock may be severed correctly in taut condition, the wire has to be positively held by the gripping jaws 3, 3a before severing. Preferable gripping jaws are shown in FIG. 12 and 13. The gripping jaw 100 in FIG. 12 comprises a pair of jaw members 101, 101a both rotatably connected to pins 102, 102a projecting from a supporting plate 103, the jaw members being connected with each other by a loose engagement of a pin 104 on one of the jaw member 101 with a slot 105 in the other of the jaw member 101a. A lever 106 having a dent 107 at one end and a pin 108 at the other end is pivotably connected to the supporting plate 103. A tension spring 109 is provided between the pin 108 and a pin 110 projecting from the jaw member 101. The gripping jaw in FIG. 12 is so constructed that when the lever is rotated against the spring, the pin 110 is forced to move along the curved surface of the lever and finally caught by the dent 107, thereby maintaining the open condition of the jaw members. On the other hand, when the lever 106 is rotated in the other direction, the engagement of the pin 110 with the dent 107 is easily released and the jaw members are closed by the action of the spring 109.

The gripping jaw shown in FIG. 13 comprises three pairs of jaw members 112, 112a all pivoted by a central pin 113, side pins 114, 114a each pivotably connecting the three jaws 112 or 112a on one side of the pairs, a slide plate 115 having a central slot through which the central pin penetrates and side lateral holes through which the side pins 114, 114a penetrate, a roller 116 mounted to an end of the slide plate 115, a tension spring 117 extending between the side pins 114, 114a, a frame 118 having slots 119 through which the side pins are guided. When the roller 116 moves toward the central pin 113, the side pins 114, 114a move in the same direction, partially rotating about the central pin 113. As soon as the spring 117 goes beyond the central pin 113, the jaw members 112, 112a are closed by the action of the spring.

Power to operate the pin 108 in FIG. 12 or the roller 116 in FIG. 13 can easily be obtained by a simple link mechanism. Referring to the power transmission to the gripping jaw 3 on the immovable block 1, a T-shaped lever 58 is provided to partially rotate in the clockwise direction about a pivot 57 when the crank arm 22 is rotated to the position shown by chain line. The T-shaped lever 58 is pivotably connected at its free end to an end of a lever 56 which is rotatable about a pivot 55. The lever 56 is pivotably connected at the other end thereof with a rod 54 which straightly moves to operate the pin 108 in FIG. 12 or roller 116 in FIG. 13. Referring next to the power transmission to the gripping jaw 3a on the movable block 2, a lever 52 is pivoted to the movable block 2 to rotate in the clockwise direction as its free end is pushed away by the cam roller 42 moving along the cam plate 41. The lever 52 is pivotably connected to a rod 51 which straightly moves to operate the pin 108 in FIG. 12 or roller 116 in FIG. 12.

The both gripping jaws 3, 3a may be simultaneously opened or closed as shown in the third embodiment, particularly in FIG. 8. In this embodiment, when a projection 120 on the lower carrier member 11 pushes an end of a pivoted member 121 on the movable block side, the other end of the pivoted member 121 collides with a protrusion 124 of a guide ring 123 fixed to a shaft 122 extending between the both blocks and makes the shaft 122 rotate in the clockwise direction in FIG. 8. For simplification, reference is made hereinafter to operational structure of the gripping jaw 111 on the movable block side, but same can be applied to the immovable block side. By rotation of the shaft 122, a hook lever 126 secured to the shaft 122 is rotated against tension of a spring 125 and disengaged from a lever 127. Therefore, a board 128 pushes the roller 116 of the gripping jaw 111 by the action of the spring 129 and closes the jaw. Restoration of the board 128 to the rest position shown by chain line in FIG. 8 is effected by a rotational movement of the conveyer disk 4a. The conveyer disk 4a rotates in the direction shown by an arrow in FIG. 8 and has a plurality of concentric pins 130 and gripping jaws 111. When the conveyer disk 4a rotates from the position in FIG. 8, the pin 130 pushes the protuberance 127a of the lever 127 to rotate the latter in the clockwise direction. Therefore, the lever 127 restores the board 128 to the rest position and is again engaged with the hook lever 126. The closed gripping jaw 111 is forcedly opened when the gripping jaw 111 rotating together with the conveyer disk 4a cooperates with a wedge shaped member 131 immovably fixed to the block 2 to pass through a space between the roller 116 and the frame 118.

After the wire 5 is held by the gripping jaws 3, 3a, a cutting blade 59 is operated to sever the wire at a place adjoining a wire guide 6. The cutting blade 59 is operatively connected to an end of the T-shaped lever 58 and is moved up and down by pivotal movement of the T-shaped lever 58. The operational timing of the blade 59 can easily be adjusted by controlling the space between the tip of the blade and the wire.

The clamp 30 is operated to open the cramping mouth while the lower carrier member 11 advances after the upper carrier member 12 has been stopped. For this operation provided, in the first embodiment, is a connecting lever 61 which has a hole at its one end, in which the pin 39 on the T-shaped lever is pivoted, and an elongated slot 62 at its other end, with which a pin 63 on the L-shaped lever loosely engages. In this structure, when the lower carrier member 11 further advances after the pin 63 has contacted the left side of the elongated hole 62 in FIG. 2, the connecting lever 61 is drawn forwards to rotate the T-shaped lever 32 in a clockwise direction about the pivot 15. Accordingly, the L-shaped cramp plate 31a slides relative to the J-shaped cramp plate 31, thereby opening the clamping mouth against the force of the spring 64. The cramp operating means 60 set forth above with reference to the first embodiment is substantially same as those of the second embodiment shown in FIG. 4 and the third embodiment shown in FIGS. 5 – 11, except that the connecting levers 41, 61 in the second and third embodiments engage through their elongated slots 42, 62 with pins 17, 93 set up on the lower carrier member 11, respectively.

Once the L-shaped cramp plate 31a is moved to open the cramping mouth, the cramp plate 31a is set to the open position by a hitch means 70. The hitch means 70 comprises a hitch member 71 pivoted to the upper carrier member 12 by a pin 72, and a tension spring 74 provided between the hitch member 71 and a pin 74 on the upper carrier member 12 to urge the hitch member 71 toward the L-shaped cramp plate 31a. Once the hitch menber 71 is engaged with the L-shaped cramp plate 31a, the engagement cannot be released until the hitch member 71 is rotated in the clockwise direction.

In order that the hitch member 71 may be disengaged from the L-shaped cramp plate 31a to close and bite the fore end of the succeeding continuous wire 5 at the most retreated position of the carrier 10, a stopper 75 is provided on the immovable block side 1. When the carrier 10 retreats with the cramping mouth being open, the cramp 30 collides against the slidable wire guide 6 and pushes back the latter against the spring therein. Then, the lower end 73 of the hitch member 71 collides against the stopper 75 at the most retreated position of the carrier 10 and rotates in the clockwise direction to release the engagement between the hitch member 71 and the L-shaped cramp plate 31a. When such engagement is released, the L-shaped cramp plate 31a moves to the closing position by the action of the spring 64, thereby biting the fore end of the continuous wire positioning in the cramping mouth.

In another modification for releasing the engagement of the hitch member 71 with the cramp 30, shown in FIGS. 5 – 11, a stopper 75 projects through the immovable block 1, against which the upper carrier member 12 collides when the carrier moves back to the most retreat position. When the upper carrier member collides against the stopper 75 and stops, the intermediate carrier member 90 moves back by inertia, so that a pin 99 set up on the intermediate carrier member 90 and guided along a slot 19 moves back and pushes back the hitch member to open the catch member 71.

Referring now to the operational timing of the apparatus, while the gripping jaws 3, 3a periodically fed to the wire severing and delivery zone are at rest and open, the carrier 10 retreats with the opened cramp 30 passing through the opened gripping jaws 3, 3a until the clamp 30 comes to the most retreated position. At the most retreated position, the clamp 30 is closed to bite the fore end of the continuous wire 5. Then, while the gripping jaws 3, 3a are still open at rest, the clamp 30 biting the wire advances through the jaws 3, 3a along with the advancement of the carrier. When the carrier 10 cooperates with the cam plate 41, of which position is determined in accordance with the length of the wire to be severed, the gripping jaws 3, 3a are operated to hold the wire 5 and then the clamp 30 is operated to open. Thereafter, the blade 59 is operated to sever the wire 5. After the wire is severed, the conveyers 4, 4a are rotated so that the succeeding gripping jaws in the open condition are positioned in the wire severing and delivery zone. Thus, the same operations are repeated.

The apparatus according to the present invention is so constructed that many advantages can be obtained. Firstly, when the movable block is spaced apart from the immovable block in accordance with the wire length to be severed, the gripping jaws are set to the desired width for transferring the severed wire. Secondly, as the cramp 30 draws out the wire 5 form the continuous wire stock through the gripping jaws 3, 3a while the latters are open condition, the delivery of the wire to the gripping jaws 3, 3a can be positively effected. Thirdly, as the opening and closing of the gripping jaws 3, 3a and the opening of the clamp are effected by the movement of the lower carrier member 11 still advancing after the upper carrier member 12 has been stopped, the operational structure is simple and easy for handling. Fourthly, as the wire severing is effected upon predetermined cycle after the wire has been gripped, there is not fear that the wire would be severed before gripped.

Although the present invention has been disclosed with reference to preferred embodiments thereof, many modification and alteration may be made within the spirit of the present invention.

What is claimed is:

1. An apparatus for severing a wire drawn from continuous wire stock to a predetermined length and delivering the severed wire to conveyer, said apparatus comprising:

a pair of movable and immovable opposite blocks (1,2) each having a periodically and successively rotated conveyer means gripping jaws of a pair on the opposite conveyer means being faced with each other in alignment;

a carrier means (10) movable in the direction perpendicular to the conveyer moving direction, said carrier means comprising a lower carrier member (11) reciprocable for a predetermined length and an upper carrier member (12) placed upon said lower carrier member to be slidable relative to the latter in the reciprocating direction of said lower carrier member, said upper carrier member having a clamp (30) for drawing the wire from the continuous wire stock through said gripping jaws at a wire severing and delivery zone while said gripping jaws are open;

means (40) for stopping the movement of said upper carrier member in cooperation with a stopper member (41) secured to said movable block while said lower carrier member is moving forwardly;

means for opening said clamp by advancing movement of said lower carrier member while the movement of said upper carrier member is stopped;

means for retreating said carrier means after said clamp has opened, said retreating means closing said clamp at the most retreated position of said carrier means;

means (50) for closing said gripping jaws locating at said wire severing and delivery zone just before said clamp is open; and wire severing means provided near the most retreated position of said clamp.

2. An apparatus as claimed in claim 1, wherein said stopping means (40) comprises a cam plate (41) attached to said movable block (2), and a lever assembly (44, 47, 91, 92) having a pivotable lever provided with a roller (42) cooperable with said cam plate, said lever being inclined as said roller (42) advances along said cam plate and stopping said upper carrier member.

3. An apparatus as claimed in claim 1, wherein said stopping means (40) comprises an L-shaped lever (82) pivoted to said movable block (2) and having a pin (84) at its free end, and a lever (86) also pivoted to said movable block and having an hook (88) engageble with said pin on said L-shaped lever, said L-shaped lever (82) having another free end (85) cooperable with said upper carrier member, said other lever (86) having a free end (89) cooperable with said lower carrier member.

4. An apparatus as claimed in claim 2, wherein said lever assembly comprises an L-shaped lever (44) pivoted to said lower carrier member (11) and having the roller (42) at its one free end, another lever (47) pivoted at its one end with the other free end of said L-shaped lever and at its other end with said upper carrier member (12), and a tension spring (46) provided between said lower carrier member (11) and the pivotal portion of said L-shaped lever (44) and other lever (47).

5. An apparatus as claimed in claim 2, wherein said carrier means (10) further comprises an intermediate carrier member (90) slidably disposed between said upper and lower carrier members (11, 12), said intermediate carrier member being operatively connected with said lower and upper carrier members through tension springs (94) and (95), respectively; said lever assembly comprises a first link 91 pivoted at its one end with said lower carrier member (11) and a second link 92 pivoted at its one end with said intermediate carrier member (90), said both links being pivoted with each other at their other ends and having the roller (42) at their pivoted junction.

6. An apparatus as claimed in claim 2, wherein said cramp operating means comprises a J-shaped cramp plate (31), an L-shaped cramp plate (31a), and a T-shaped lever (32), said J-shaped and L-shaped cramp plates being biased to the closing position by a spring (64) and having foot portions pivoted to both arms (37, 37) of said T-shaped lever, said T-shaped lever being operatively connected to said lever assembly.

7. An apparatus as claimed in claim 1, wherein said conveyers (4, 4a) are each made of rigid disk.

8. An apparatus as claimed in claim 1, wherein each of said gripping jaws (3, 3a) comprises a pair of jaw members (101, 101a, 112, 112a), and a spring (109, 117) serving to close and open said jaw members, said jaw members being opened and closed against the spring force.

* * * * *

UNITED STATES PATENT OFFICE
CERTIFICATE OF CORRECTION

Patent No. 3,857,313          Dated December 31, 1974

Inventor(s) Shigeru Endo

It is certified that error appears in the above-identified patent and that said Letters Patent are hereby corrected as shown below:

Column 1, line 57 - "jawa" changed to --jaws--;

Column 2, line 22 - "careier" changed to --carrier--;
"mamber" changed to --member--;

Column 2, line 26 - "dray" changed to --draw--;

Column 5, line 22 - "Fig. 12" (second occurrence) changed to --Fig. 13--;

Column 7, line 21 - "form" changed to --from--;

Column 7, line 45 - after "means" inserted --(4,4a);--;

Column 7, line 45 - after "gripping jaws" inserted --(3,3a) mounted to said conveyor means, the gripping jaws--

Signed and sealed this 4th day of March 1975.

(SEAL)
Attest:

RUTH C. MASON
Attesting Officer

C. MARSHALL DANN
Commissioner of Patents
and Trademarks